Jan. 10, 1928.  1,655,727

G. HARRIS ET AL

ANTISKID CHAIN

Filed March 1, 1926

INVENTORS
GEORGE HARRIS AND
EDGAR EARL HAROLD
By John R. Keller Atty.

Patented Jan. 10, 1928.

1,655,727

UNITED STATES PATENT OFFICE.

GEORGE HARRIS AND EDGAR EARL HAROLD, OF PITTSBURGH, PENNSYLVANIA.

ANTISKID CHAIN.

Application filed March 1, 1926. Serial No. 91,438.

This invention relates to anti-skid chains, more particularly to the type of chain known as unit chains which are adapted to be applied to the wheel of an automobile to encircle the tire and felloe thereof between the spokes of the wheel.

The primary object of this invention is to provide a chain of the above-mentioned type which is of simple form and which may be conveniently and quickly placed upon the wheel and detached therefrom, and which provides positive means for securing the chain against loss.

A further object is to provide a chain which has a large range of adjustment adapting it for use on various sizes of tires within certain limits without the necessity of making a preliminary adjustment of either the tread portion or the anchoring portion of the chain before application thereof to the wheel.

A further object is to provide a chain of the floating type which is adapted to be applied loosely to the wheel and anchored to a spoke of the wheel to prevent loss thereof.

A still further object is in the provision of simple locking means for securing the chain to the wheel which shall be positive in operation for holding the connected ends of the chain, and which cannot become damaged or made inoperative to unlock through stresses or strains produced in the tread portion of the chain.

Figure 1:
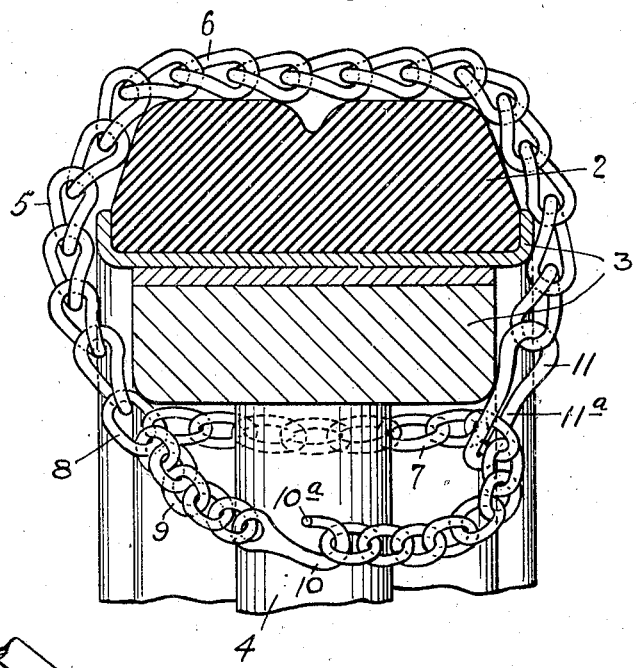
Figure 2:
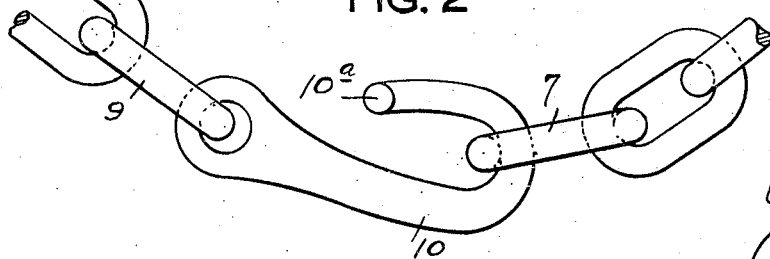
Figure 3:
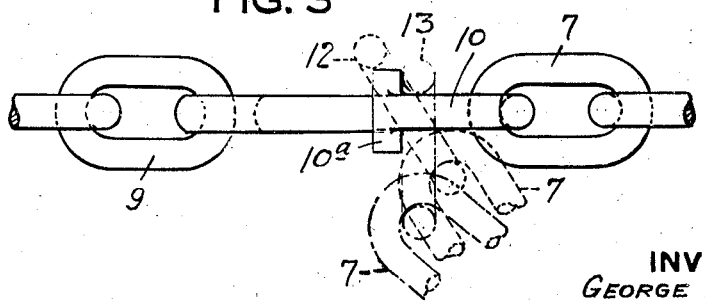

In the accompanying drawings, Fig. 1 is a cross sectional view of a portion of a wheel showing the application of our improved chain thereto; Figs. 2 and 3 are enlarged detail side and plan views, respectively, of the locking means for securing the chain to the spoke of the wheel, and Fig. 4 is a face view of the means for connecting and securing the chain around the tire and felloe.

We have illustrated our invention as applied to an ordinary truck wheel of the solid tire type in which the tire is indicated by the numeral 2, the rim and felloe 3, and the spokes of the wheel 4. The unit chain is indicated generally by the numeral 5 and is shown in Fig. 1 as applied in operative position on the wheel. The chain 5 is formed as a single member comprising a main tread or body portion 6, and an anchoring portion 7. The main body or tread portion is formed of heavy twisted links preferably of greater cross sectional area than the links of the anchoring portion of the chain, for the reason that this part of the chain is subjected to abrasion and wear through contact with the roadway and curbing, and preferably the tread portion is made of such length as to loosely encircle the tire and protect and afford tractive means at the sides of the tire for wheels of various sizes. The anchoring portion 7 of the chain is connected to the tread preferably by means of a straight link 8—this being for the purpose of permitting the anchoring portion to adjust itself freely and suspended from the twisted tread portion when said portion is under tension, and affords means for the attachment of a lateral or branch portion 9 of the chain.

The portions 7 and 9 constitute when connected together a portion of the unit chain which is adapted for securing the chain to the spoke of the wheel against loss through breakage or through wear of the tread portion. The short branch section 9 terminates at its free end in a locking element 10 which is adapted to hook into the free end of the anchoring portion 7.

Figure 4:
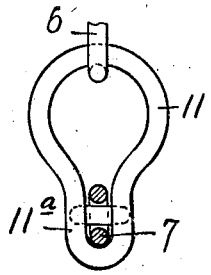

The free end of the tread portion 6 of the chain has secured thereto a holding link 11, best shown in Fig. 4, and which has an eye adapted at one portion thereof to receive the anchoring chain, whereby said chain may be freely pulled through the eye and the chain as a whole adjusted to the wheel around the tire and felloe, the eye of the link 11 having also a reduced portion 11$^a$ which is adapted to receive a link of the anchoring chain in an edgewise position only and which serves to lock the anchor chain thereto, all as clearly shown in Fig. 4.

Referring to Figs. 2 and 3, it will be seen that the free end of the hook 10 is provided with a cross bar 10$^a$ which is devised as a guard to prevent accidental disengagement of the hook from the chain portion 7. The bar 10$^a$ is made of greater length than the length of the exposed eye of the end link of portion 7, and cannot be passed through the eye of said link except only when the eye is presented to the hook in angular position, as indicated by the dotted lines 12, and it will be noted that the two end links of the chain portion 7 in this position are in full extended or stretched-out position in order that the end link can be swung over the end of the cross bar 10$^a$. The stretching out of the end links in this manner in order to effect unlocking precludes accidental disengagement as this position of the links can be assumed only through hand manipulation. The dotted lines 13 indicate a possible movement of the links through vibration in which case the bar acts as a guard.

It will be seen from the foregoing description, and from the illustrations that the chain may be applied to the wheel either tight or loose, as desired, and when so applied it will be seen that the tread portion is secured to the tire independently of the anchoring portion of the chain. That is to say, the tread portion is secured to the tire in such manner that the portion of the chain which secures the chain to the spoke is relieved of all strains as created by thrust or travel of the tread on the tire—the portion 7 being of such length as to provide slack in the chain to permit travel of the tread circumferentially of the tire within the limits of the spacing between spokes, whether the tread be applied tightly or loosely, thus providing for relieving the anchoring means from stress or strains.

We claim as our invention:

1. A unit anti-skid chain comprising a single length of chain, means on the chain for connecting the chain in a loop around the tire and felloe of the wheel, and means separate and disconnected from said first means for connecting the chain in a loop of fixed size around a spoke of the wheel, said first means being adjustable to fixed connection with said spoke loop.

2. A unit anti-skid chain comprising a single chain length formed in part at one end as a tread portion and at the other end as an anchoring portion, a link on the free end of the tread portion having an eye through which the anchoring portion may be threaded, said eye adapted for holding the anchoring chain against movement therethrough, and means disposed on said chain intermediate the ends thereof for connecting with the free end of the anchoring portion to form an elongated loop for loosely securing the chain around a spoke of the wheel.

In testimony whereof we, the said GEORGE HARRIS and EDGAR EARL HAROLD, have hereunto set our hands.

GEORGE HARRIS.
EDGAR EARL HAROLD.